United States Patent
Marriott

(10) Patent No.: US 6,386,253 B1
(45) Date of Patent: May 14, 2002

(54) TIRE INCLUDING BLOCK HAVING CONTINUOUS RIDGE AND SMALL GROOVE

(75) Inventor: Peter Robert Marriott, Hurley Common (GB)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/336,600

(22) Filed: Jun. 21, 1999

(30) Foreign Application Priority Data

Jun. 30, 1998 (GB) .............................................. 9814102

(51) Int. Cl.⁷ ...................... B60C 11/11; B60C 107/00
(52) U.S. Cl. ............................ 152/209.15; 152/209.21; 152/902; 152/DIG. 3; 425/812
(58) Field of Search ...................... 152/209.15, 209.21, 152/209.22, 209.27, DIG. 3, 209.18, 900, 901, 902; 425/28.1, 46, 812

(56) References Cited

U.S. PATENT DOCUMENTS

| | | | | |
|---|---|---|---|---|
| 1,880,430 A | * | 10/1932 | Furnas ................... | 152/209.15 |
| 2,130,594 A | * | 9/1938 | Mooradian ............. | 152/209.15 |
| 2,670,777 A | * | 3/1954 | Wallace ................... | 152/209.15 |
| 4,296,289 A | * | 10/1981 | Roberts et al. ........ | 152/209.27 |
| 5,656,107 A | * | 8/1997 | Laurent et al. ........ | 152/209.15 |
| 5,909,756 A | * | 6/1999 | Miyazaki ................ | 152/209.22 |
| 6,021,830 A | * | 2/2000 | Iwamura ................ | 152/209.15 |

FOREIGN PATENT DOCUMENTS

| | | | | |
|---|---|---|---|---|
| CA | 2084741 | * | 6/1993 | ............ 152/209.22 |
| DE | 3709427 | * | 9/1988 | |
| EP | 348335 | * | 12/1989 | ............ 152/209.22 |
| FR | 42436 | * | 7/1933 | ............ 152/209.15 |
| JP | 54-69191 | * | 6/1979 | |
| JP | 62-268709 | * | 11/1987 | ............ 152/DIG. 3 |
| JP | 7-186633 | * | 7/1995 | ............ 152/209.15 |

* cited by examiner

Primary Examiner—Steven D. Maki
(74) Attorney, Agent, or Firm—Birch, Stewart, Kolasch & Birch, LLP

(57) ABSTRACT

A tire having a ground contacting tread comprising tread grooves which divide the tread into a plurality of tread pattern elements provided on its radially outer surface with a radially outwardly projecting ridge disposed on an edge of the pattern element and at least one radially inwardly projecting small groove extending to the projecting ridge which facilitates the dispersal of trapped air in the molding and vulcanization operation of the tire manufacturing process.

13 Claims, 2 Drawing Sheets

TIRE INCLUDING BLOCK HAVING CONTINUOUS RIDGE AND SMALL GROOVE

BACKGROUND OF THE INVENTION

The present invention relates to tires and particularly to aspects of the design of the tread region of the tire which can facilitate the dispersal of trapped air in the molding and vulcanizing operation of the tire manufacturing process.

A problem which commonly arises in the molding of elastomeric articles such as tires is the trapping of air between the surfaces of the article and the mould. Such trapped air prevents the elastomeric article from contacting the mould surface and thus locally reduces conductive heat transfer which effects vulcanization in an uncontrolled way and spoils the finished surface appearance. In the tire art such resultant blemishes are termed "bareness".

In tires having block-type tread patterns, bareness on the top surface of the blocks can be a particular problem due to their relatively flat surface.

To help prevent bareness on tires, tire moulds are commonly vented by means of holes of very small diameter provided through the mould wall. Such vent holes allow trapped air to escape but suffer the disadvantage that rubber can also flow into the hole resulting in bristle-like projections or 'spue-pips' covering the surface of the molded tire.

Such spue-pips detract from the visual appearance of the tire and are normally removed by rotating the tire against a trimming knife held to the tire surface. However such removal of spue-pips in the tire tread region presents a particular problem because of the potential damage which can be done to the salient features of the tread pattern.

SUMMARY OF THE INVENTION

Accordingly it is an object of the present invention to provide a tire in which features of the tread pattern can assist in dispersal of trapped air in molding, thereby reducing the need for vent holes in the tread region.

According to the present invention there is provided a tire having a ground contacting tread comprising tread grooves dividing the tread into a plurality of pattern elements each having edges, wherein at least one pattern element is provided on its radially outer surface with a radially outwardly projecting ridge disposed on an edge of the pattern element and at least one radially inwardly projecting small groove which extends to the projecting edge.

By small groove is meant a groove having a width and depth not more than 3 mm.

Preferably a plurality of small grooves are provided.

The combination of small grooves in the surface of a tread pattern element which communicate with a raised ridge on the edge of the element has proven effective in dispersing, during molding, trapped air from the tread region without the need for venting.

Preferably the surface of the pattern element is criss-crossed by a plurality of such intersecting small grooves.

Sipes or knife-cuts may also be provided in the pattern element and may also be wholly contained within one or more of the small grooves.

BRIEF DESCRIPTION OF THE DRAWINGS

Further aspects of the present invention will become apparent from the following description by way of example only of one embodiment in conjunction with the following drawings in which.

DETAILED DESCRIPTION OF THE INVENTION

Figure 1:
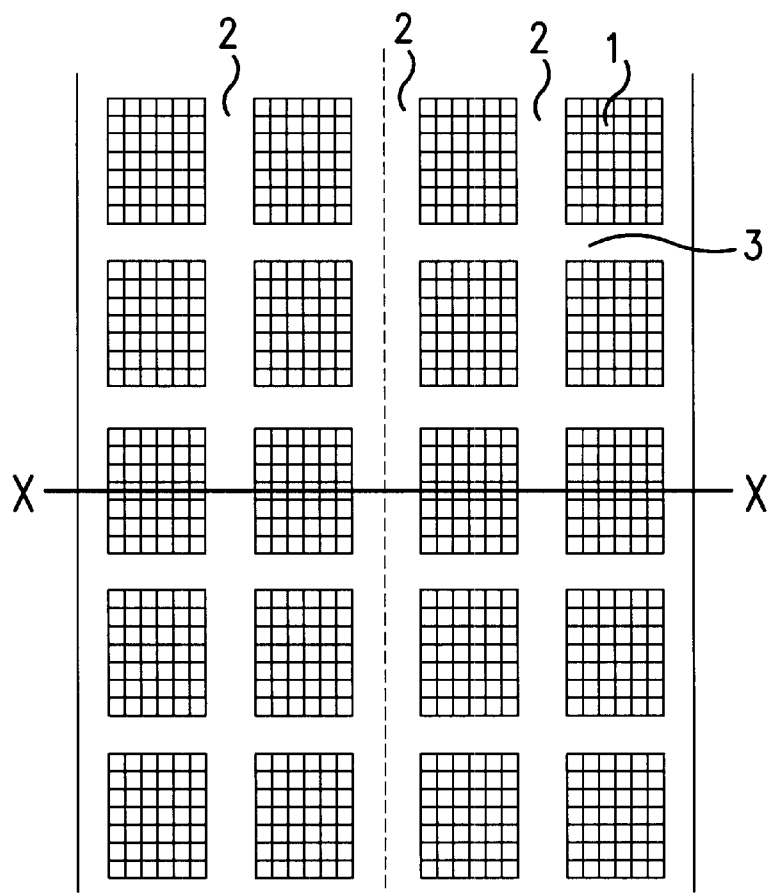
FIG. 1 shows a scrap plan view of a tire tread according to the present invention.
Figure 2:
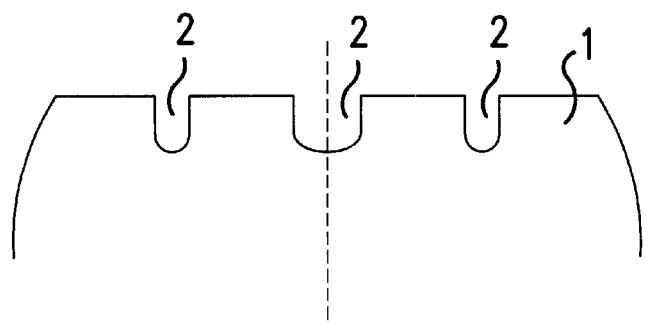
FIG. 2 shows a partial radial cross-section through the tread of FIG. 1 taken along line X—X.

Shown in FIG. 1 is a plan view of a block-type tire tread pattern comprising pattern elements or blocks 1 defined by circumferential straight grooves 2 and axially extending straight grooves 3.

Figure 3:
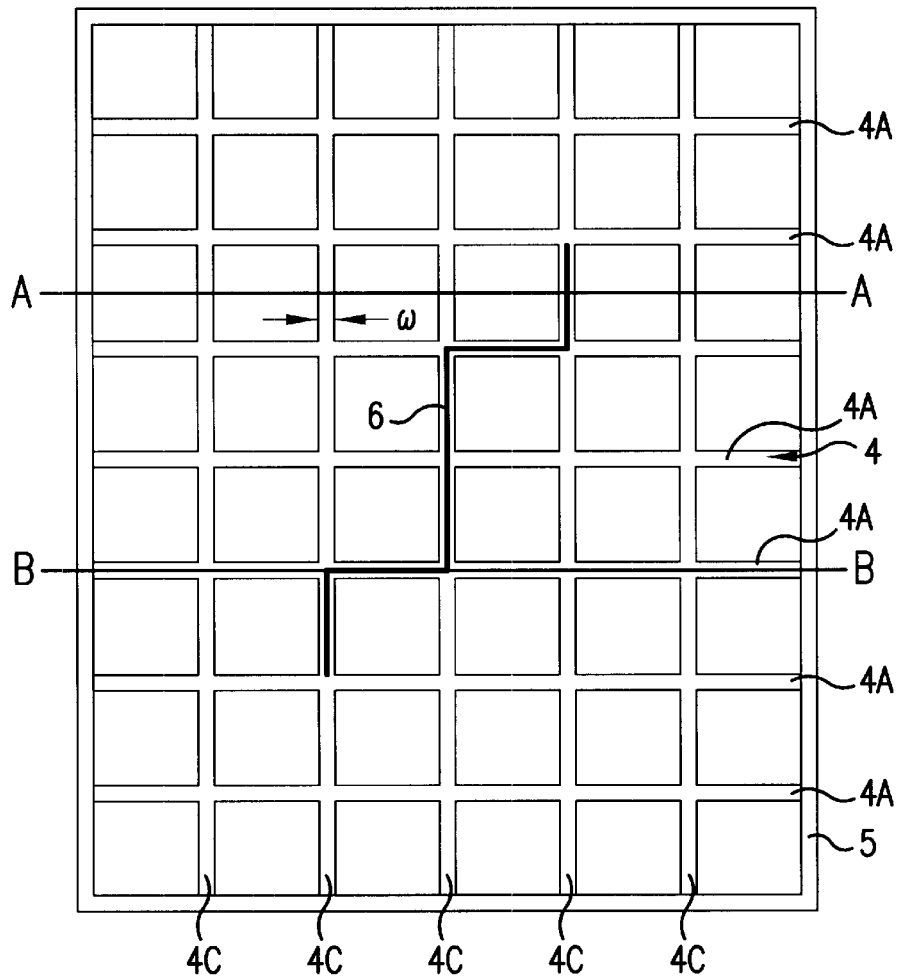
FIG. 3 shows further details of one of the tread blocks of the tire tread of FIG. 1.
Figure 4:
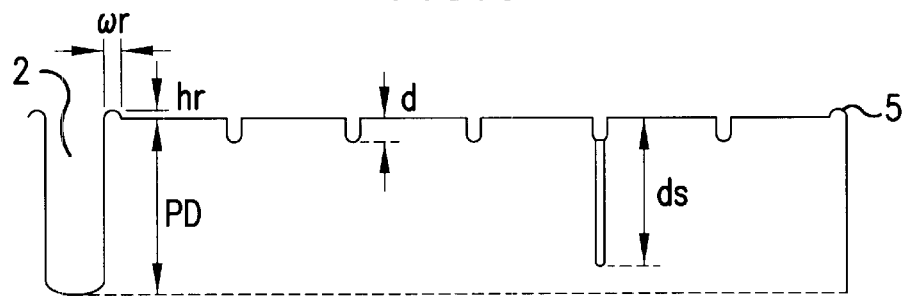
FIG. 4 shows a scrap radial cross-section of the tread block of FIG. 3 taken along section A—A.
Figure 5:
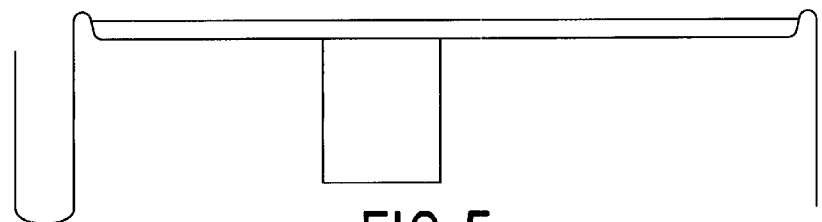
FIG. 5 shows a scrap radial cross-section of the tread block of FIG. 3 taken along section B—B.

As shown in FIGS. 3–5, each of the pattern elements 1 has on its radially outer surface a criss-cross pattern of radially inwardly extending small grooves 4 which extend to join or communicate with a radially outwardly projecting ridge 5 which extends on the outer surface of the block around the whole of the block edge.

In this embodiment the criss-cross pattern of small grooves 4 comprises a first plurality of circumferentially extending grooves 4C and a second plurality of axially extending grooves 4A, each of the grooves 4C of the first plurality intersecting with each of the grooves 4A of the second plurality.

It can be clearly seen that each of the grooves 4C of the first plurality is parallel and equally spaced from adjacent grooves as are the axial grooves 4A of the second plurality. The grooves intersect at right angles.

The width w and depth d of the small grooves is 0.7 mm. These dimension may lie in the range of 0.3–1.5 mm.

Similarly the width wr and height hr of the ridge 5 are also 0.7 mm and again may lie in the range 0.3–1.5 mm.

The cross-sectional shape of the small grooves 4 and the edge ridge 5 may take any form and is not restricted to the round bottomed and round topped sections shown.

As also shown in FIGS. 3–5 the block may have a very narrow groove/knife cut 6 commonly known as a sipe. Such sipes may be provided as shown wholly within the narrow grooves 4 and extend radially inwards to a depth ds which may lie in the range of 50% to 95% of the full pattern depth PD.

While the above embodiment has the small groove criss-crossing the block surface in a regular pattern other configurations of a single or multiple groove communicating with a raised rib at the block edge are possible within the invention and will provide enhanced dispersion of trapped air in the molding operation.

For example the small grooves within a plurality may not be parallel or equi-spaced and the small grooves may intersect at different angles other than right angles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described my invention what I claim is:

1. A tire having a ground-contacting tread portion comprising tread grooves dividing the tread into a plurality of pattern elements, each of said pattern elements comprising a tread block, and having edges wherein at least one pattern element is provided on its radially outer surface with a radially outwardly projecting continuous ridge which defines the edges of the pattern element and at least one radially, inwardly-extending small groove which extends across the pattern element to reach the outwardly projecting ridge without crossing the ridge.

2. The tire according to claim 1, wherein the pattern element is provided with at least two such radially, inwardly projecting small grooves.

3. The tire according to claim 2, wherein the pattern element is provided with a first plurality of radially, inwardly projecting small grooves which extend in the axial direction of the tire and a second plurality of radially, inwardly projecting small grooves which extend in the circumferential direction of the tire.

4. The tire according to claim 3, wherein each of the small grooves of the first plurality of small grooves are mutually parallel and each of the small grooves of the second plurality of small grooves are mutually parallel.

5. The tire according to claim 4, wherein the small grooves intersect at a right angle.

6. The tire according to claim 3, wherein the small grooves of the first plurality of small grooves are equi-spaced from each other and the small grooves of the second plurality of small grooves are equi-spaced from each other.

7. The tire according to claim 1, wherein the radially, outwardly-projecting ridge defines all peripheral edges of each pattern element.

8. The tire according to claim 1, wherein the small groove has a width in the range of 0.3 to 1.5 mm.

9. The tire according to claim 1, wherein the small groove has a depth in the range of 0.3 to 1.5 mm.

10. The tire according to claim 1, wherein the radially, outwardly-projecting ridge has a width in the range 0.3 to 1.5 mm.

11. The tire according to claim 1, wherein the radially, outwardly-projecting ridge has a height in the range 0.3 to 1.5 mm.

12. A tire which comprises:

a ground-contacting tread portion which is divided by a plurality of tread grooves into a plurality of tread blocks, each of said blocks having peripheral edges, each of said tread blocks being provided on its radially outer surface with a radially, outwardly-projecting continuous ridge which defines said peripheral edges of the tread blocks and each of said tread blocks containing a plurality of radially, inwardly-extending small grooves which extend across the tread block to reach the outwardly-projecting ridge without crossing the ridge.

13. The tire of claim 12, wherein the plurality of small grooves extend axially and circumferentially between the peripheral edges of the tread blocks.

* * * * *